US012646640B2

(12) United States Patent
Takamura et al.

(10) Patent No.: US 12,646,640 B2
(45) Date of Patent: Jun. 2, 2026

(54) LAMINATED VARISTOR

(71) Applicant: Panasonic Intellectual Property Management Co., Ltd., Osaka (JP)

(72) Inventors: Masashi Takamura, Hokkaido (JP); Ken Yanai, Hokkaido (JP); Yuji Yamagishi, Hokkaido (JP); Sayaka Watanabe, Hokkaido (JP); Yuto Akiyama, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 468 days.

(21) Appl. No.: 18/499,299

(22) Filed: Nov. 1, 2023

(65) Prior Publication Data

US 2024/0177894 A1 May 30, 2024

(30) Foreign Application Priority Data

Nov. 29, 2022 (JP) ................................ 2022-190473

(51) Int. Cl.
*H01C 7/10* (2006.01)
*H01C 1/148* (2006.01)

(52) U.S. Cl.
CPC ............... *H01C 7/10* (2013.01); *H01C 1/148* (2013.01)

(58) Field of Classification Search
CPC . H01C 7/10; H01C 1/148; H01C 7/18; H01C 1/14; H01C 10/16; H01G 4/30
See application file for complete search history.

(56) References Cited

U.S. PATENT DOCUMENTS

| | | | | |
|---|---|---|---|---|
| 5,815,367 A * | 9/1998 | Asakura | H01G 4/40 333/204 |
| 8,189,321 B2 * | 5/2012 | Togashi | H01G 4/232 361/321.1 |
| 8,654,504 B2 * | 2/2014 | Sakuratani | H01G 4/005 361/321.1 |
| 10,529,472 B2 * | 1/2020 | Kirk | H01C 1/16 |
| 2009/0309691 A1 * | 12/2009 | Ito | H01C 7/18 338/22 R |

FOREIGN PATENT DOCUMENTS

JP 07-235406 9/1995

* cited by examiner

*Primary Examiner* — Kyung S Lee
(74) *Attorney, Agent, or Firm* — Rimon P.C.

(57) ABSTRACT

A laminated varistor includes a sintered body and first to third internal electrodes provided inside the sintered body. The first internal electrode includes a first facing part facing the third internal electrode in a third direction, and a first connecting part connecting the first facing part and the first external electrode. The second internal electrode includes a second facing part facing the third internal electrode in the third direction, and a second connecting part connecting the second facing part and the second external electrode. The first connecting part includes a first connection portion connected to the first external electrode, and a first narrow part having a dimension in a second direction smaller than the first connection portion. The second connecting part includes a second connection portion connected to the second external electrode, and a second narrow part having a dimension in the second direction smaller than the second connection portion.

7 Claims, 8 Drawing Sheets

LAMINATED VARISTOR

BACKGROUND

1. Technical Field

The present disclosure relates to a laminated varistor. More specifically, the present disclosure relates to a laminated varistor having a sintered body having a laminated structure in which a plurality of layers are laminated.

2. Description of the Related Art

In recent years, miniaturization of home appliances and in-vehicle electronic devices has progressed, and a varistor which is a component thereof is also required to be miniaturized. In addition, as a frequency increases, an electrostatic capacitance affects performance, and thus, a varistor having a small electrostatic capacitance and a small variation thereof while ensuring a predetermined varistor voltage is required. In addition, in a case where varistors are used in pairs, in order to reduce a difference in electrostatic capacitance between the pairs, it has been proposed that two varistors are formed in one element.

Note that, for example, Unexamined Japanese Patent Publication No. 07-235406 is known as a related prior art document.

A chip capacitive varistor disclosed in Unexamined Japanese Patent Publication No. 07-235406 has a sintered body formed by laminating and firing four green sheets including a green sheet having a first internal electrode formed on almost the entire front surface and a green sheet having second and third internal electrodes respectively formed at both ends in a longitudinal direction of the front surface. Then, one capacitive varistor element is formed by the pair of the first internal electrode and the second internal electrode, and one capacitive varistor element is formed by the pair of the first internal electrode and the third internal electrode.

SUMMARY

In the chip capacitive varistor disclosed in Unexamined Japanese Patent Publication No. 07-235406, there is a demand for reducing crosstalk between two built-in varistors.

An object of the present disclosure is to provide a laminated varistor capable of reducing crosstalk generated between two varistors.

A laminated varistor according to an aspect of the present disclosure includes a sintered body, a first internal electrode, a second internal electrode, a third internal electrode, a first external electrode, a second external electrode, and a third external electrode. The sintered body includes a first end surface and a second end surface facing each other in a first direction, a first side surface and a second side surface facing each other in a second direction intersecting the first direction, and a first principal surface and a second principal surface facing each other in a third direction intersecting the first direction and the second direction. The sintered body has a laminated structure in which a plurality of layers are laminated along the third direction. The first internal electrode is provided on a predetermined lamination surface in the sintered body and extends along the first direction. The second internal electrode is provided on a lamination surface different from the first internal electrode in the sintered body, and extends along the first direction. The third internal electrode is provided on a lamination surface different from the first internal electrode and the second internal electrode in the sintered body, and extends in the second direction. The first external electrode is provided on the first end surface and is connected to the first internal electrode. The second external electrode is provided on the second end surface and is connected to the second internal electrode. The third external electrode is provided on at least one of the first side surface and the second side surface, and is connected to the third internal electrode. The first internal electrode includes a first facing part facing the third internal electrode in the third direction, and a first connecting part connecting the first facing part and the first external electrode. The second internal electrode includes a second facing part facing the third internal electrode in the third direction, and a second connecting part connecting the second facing part and the second external electrode. The third internal electrode is disposed between the first facing part and the second facing part. The first connecting part includes a first connection portion connected to the first external electrode, and a first narrow part having a dimension in the second direction smaller than the first connection portion. The second connecting part includes a second connection portion connected to the second external electrode, and a second narrow part having a dimension in the second direction smaller than the second connection portion.

An object of the present disclosure is to reduce crosstalk that occurs between two varistors.

DETAILED DESCRIPTIONS

Each of the drawings described in the following exemplary embodiments is a schematic view, and the ratio of the size and the thickness of each component in each drawing does not necessarily reflect the actual dimensional ratio.

Exemplary Embodiment (1) Overview

Hereinafter, a laminated varistor 1 according to an exemplary embodiment of the present disclosure will be described with reference to the drawings.

Figure 1:
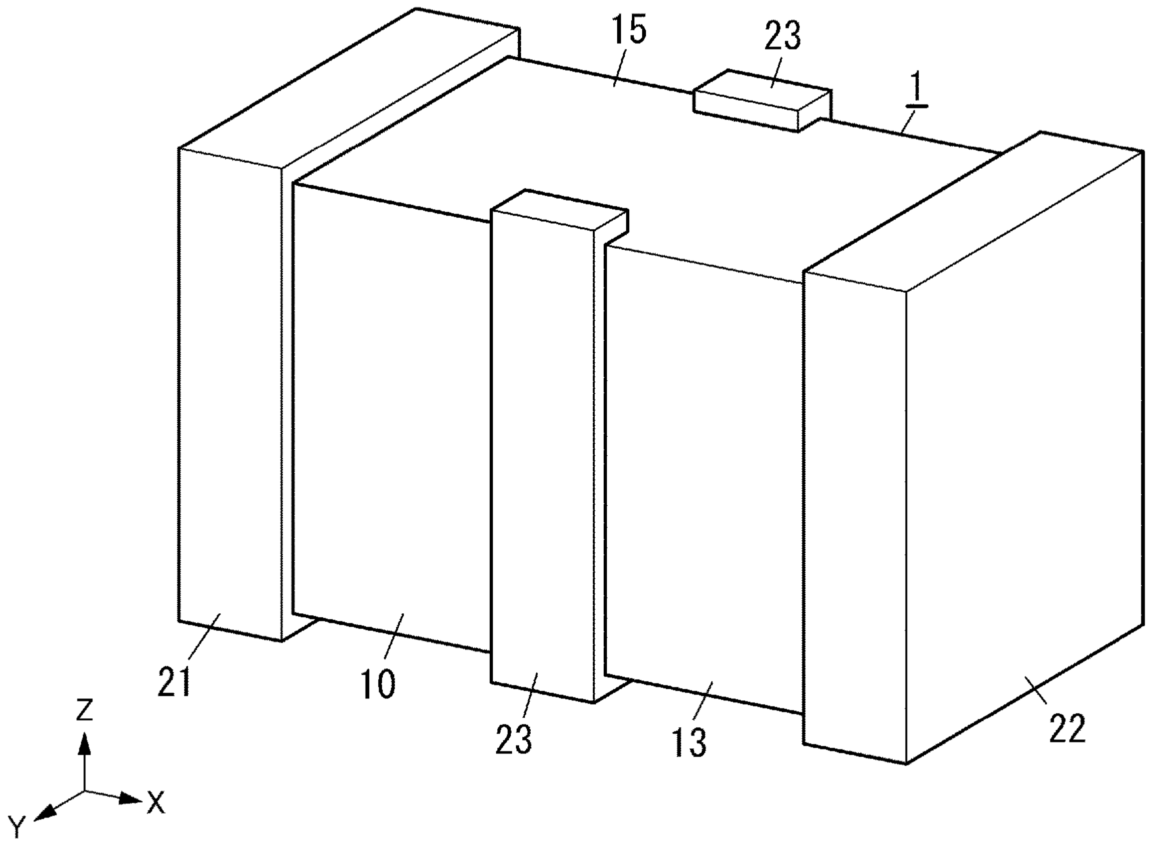
FIG. 1 is an external perspective view of a laminated varistor according to an exemplary embodiment of the present disclosure.
Figure 2:
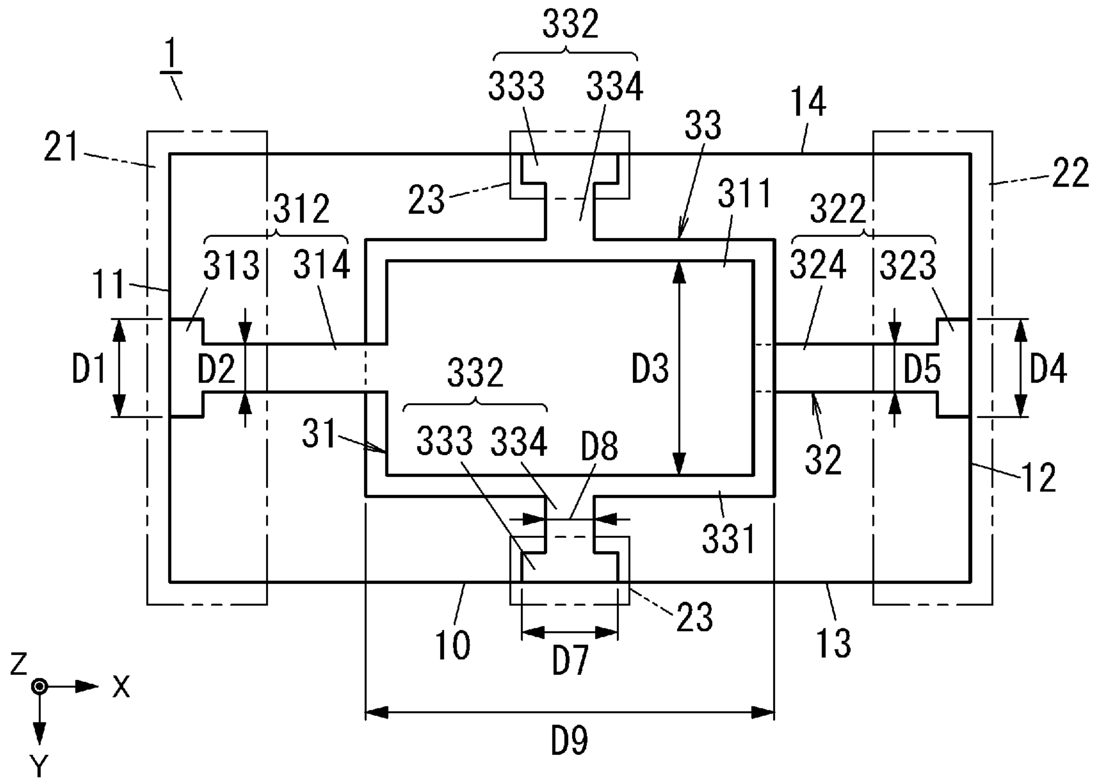
FIG. 2 is a transparent view of the laminated varistor as viewed from above.
Figure 3:
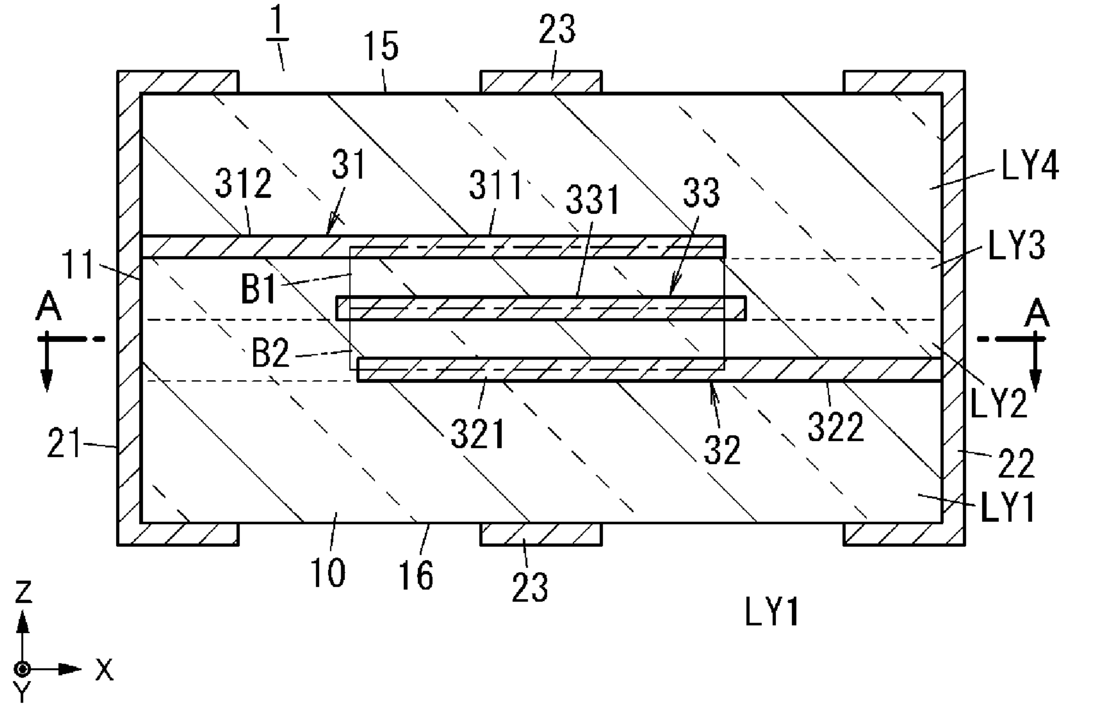
FIG. 3 is a cross-sectional view of the laminated varistor.
Figure 4:
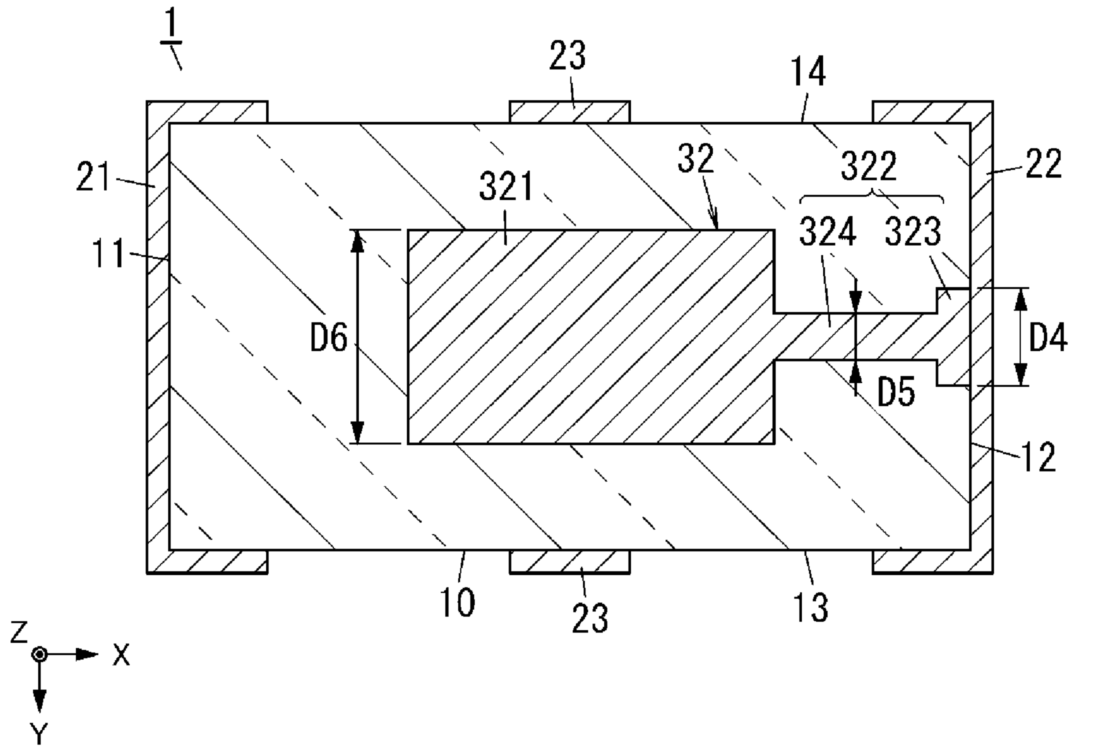
FIG. 4 illustrates the laminated varistor, and is a cross-sectional view taken along line A-A of FIG. 3.

FIG. 1 is an external perspective view of laminated varistor 1 of the present exemplary embodiment, FIG. 2 is a transparent view of laminated varistor 1 from above, FIG. 3 is a cross-sectional view of laminated varistor 1, and FIG. 4 is a cross-sectional view taken along line A-A in FIG. 3.

Laminated varistor 1 includes sintered body 10, first external electrode 21, second external electrode 22, third external electrode 23, first internal electrode 31, second internal electrode 32, and third internal electrode 33. Sintered body 10 of laminated varistor 1 excluding the external electrodes (first to third external electrodes 21 to 23) has, for example, a rectangular parallelepiped shape with a length of 1.6 mm, a width of 0.8 mm, and a height of 0.8 mm. Note that, in the external perspective view of FIG. 1 and the like, although an outer shape of sintered body 10 is illustrated in a rectangular parallelepiped shape, corners of sintered body 10 may be appropriately chamfered, and the corners of sintered body 10 may be rounded.

In the following description, as illustrated in FIGS. 1 to 4, an X-axis direction parallel to a long side direction of sintered body 10 is defined as a left-right direction, a Y-axis direction is defined as a front-back direction (depth direction), and a Z-axis direction is defined as an up-down direction. Further, a positive orientation in the X-axis direction is defined as a right side, a positive direction in the Y-axis direction is defined as a front side, and a positive direction in the Z-axis direction is defined as an upper side. However, these directions are examples, and are not intended to limit a direction of laminated varistor 1 at the time of use. In addition, arrows that point the directions are illustrated only for explanation in the drawings. The arrows are unsubstantial.

As illustrated in FIGS. 1 to 4, sintered body 10 has first end surface 11 and second end surface 12, first side surface 13 and second side surface 14, and first principal surface 15 and second principal surface 16. First end surface 11 and second end surface 12 face each other in a first direction (for example, direction parallel to an X-axis). first side surface 13 and second side surface 14 face each other in a second direction (for example, direction parallel to a Y-axis) intersecting the first direction. First principal surface 15 and second principal surface 16 face each other in a third direction (for example, direction parallel to a Z-axis) intersecting the first direction and the second direction. Sintered body 10 has a laminated structure in which a plurality of (for example, four) layers LY1 to LY4 are laminated along the third direction.

First internal electrode 31, second internal electrode 32, and third internal electrode 33 are provided inside sintered body 10.

First internal electrode 31 is provided on a predetermined lamination surface (for example, front surface of layer LY3) in sintered body 10, and extends along the first direction.

Second internal electrode 32 is provided on a lamination surface (for example, front surface of layer LY1) different from first internal electrode 31 in sintered body 10, and extends along the first direction.

Third internal electrode 33 is provided on a lamination surface (for example, front surface of layer LY2) different from each of first internal electrode 31 and second internal electrode 32 in sintered body 10, and extends in the second direction.

First external electrode 21 is provided on first end surface 11 and is connected to first internal electrode 31.

Second external electrode 22 is provided on second end surface 12 and is connected to second internal electrode 32.

Third external electrode 23 is provided on at least one of first side surface 13 and second side surface 14, and is connected to third internal electrode 33.

First internal electrode 31 includes first facing part 311 facing third internal electrode 33 in the third direction, and first connecting part 312 connecting first facing part 311 and first external electrode 21.

Second internal electrode 32 includes second facing part 321 facing third internal electrode 33 in the third direction, and second connecting part 322 connecting second facing part 321 and second external electrode 22.

Third internal electrode 33 is disposed between first facing part 311 and second facing part 321. In other words, third internal electrode 33 is provided on the lamination surface positioned between the lamination surface on which first internal electrode 31 is formed and the lamination surface on which the second internal electrodes 32 are formed in sintered body 10.

First connecting part 312 includes first connection portion 313 connected to first external electrode 21 and first narrow part 314 having a smaller dimension in the second direction than first connection portion 313.

Second connecting part 322 includes second connection portion 323 connected to second external electrode 22 and second narrow part 324 having a smaller dimension in the second direction than second connection portion 323.

Here, a case where two members are "connected" means that two members are electrically connected, that two members are not limited to being directly connected, and that two members may be indirectly connected via another member. Note that, in the present exemplary embodiment, third external electrode 23 is provided on both first side surface 13 and second side surface 14, and is connected to third internal electrode 33. In addition, the second direction is, for example, a direction orthogonal to the first direction, and the third direction is, for example, a direction orthogonal to each of the first direction and the second direction. Note that, a case where two directions are "orthogonal" is not limited to a case where two directions intersect at an angle of 90 degrees, and an intersection angle of two directions may be deviated by about several degrees from 90 degrees.

In laminated varistor 1 of the present exemplary embodiment, in first connecting part 312 of first internal electrode 31, a width of first narrow part 314 connecting first connection portion 313 and first facing part 311 is narrower than a width of first connection portion 313. In addition, in second connecting part 322 of second internal electrode 32, a width of second narrow part 324 connecting second connection portion 323 and second facing part 321 is narrower than a width of second connection portion 323. As a result, an electrostatic capacitance formed between first internal electrode 31 and third internal electrode 33 and an electrostatic capacitance formed between second internal electrode 32 and third internal electrode 33 can be reduced as compared with a case where first narrow part 314 and second narrow part 324 are not provided. Accordingly, it is possible to reduce crosstalk generated between first varistor B1 formed between first internal electrode 31 and third internal electrode 33 and second varistor B2 formed between second internal electrode 32 and third internal electrode 33.

In addition, in first connecting part 312 of first internal electrode 31, since dimension D1 of first connection portion 313 in the second direction is larger than dimension D2 of first narrow part 314 in the second direction, stability of connection between first internal electrode 31 and first external electrode 21 is improved as compared with a case where first narrow part 314 is connected to first external electrode 21.

In addition, in second connecting part 322 of second internal electrode 32, since dimension D4 of second connection portion 323 in the second direction is larger than dimension D5 of second narrow part 324 in the second direction, stability of connection between second internal electrode 32 and second external electrode 22 is improved as compared with a case where second narrow part 324 is connected to second external electrode 22.

(2) Details

Laminated varistor 1 of the present exemplary embodiment will be described in detail with reference to FIGS. 1 to 4.

As described above, laminated varistor 1 includes sintered body 10 having a laminated structure in which a plurality of layers are laminated. Sintered body 10 contains a semiconductor ceramic component having non-linear resistance characteristics. Sintered body 10 may contain, for example, ZnO as a main component, may contain at least one of $Bi_2O_3$, $CO_2O_3$, $MnO_2$, and $Sb_2O_3$ as sub-components, and may contain at least one of $Pr_6O_{11}$, $Co_2O_3$, $CaCO_3$, and $Cr_2O_3$. Sintered body 10 has a form in which ZnO is sintered and other sub-components are precipitated at grain boundaries thereof, and internal electrodes (first to third internal electrodes 31 to 33) are formed between the laminated layers. Then, the nonlinear resistance characteristics are exhibited by a grain boundary barrier formed between ZnO grains. Sintered body 10 of the present exemplary embodiment is formed by, for example, laminating and then sintering four layers LY1 to LY4 (see FIG. 3) containing ZnO as the main component.

First to third internal electrodes 31 to 33 are provided inside sintered body 10. First to third internal electrodes 31 to 33 contain, for example, Ag, Pd, PdAg, PtAg, or the like. Sintered body 10 has, for example, a laminated structure (see FIG. 3) in which four layers LY1 to LY4 are laminated in the third direction, second internal electrode 32 is formed on an upper surface of layer LY1, third internal electrode 33 is formed on an upper surface of layer LY2, and first internal electrode 31 is formed on an upper surface of layer LY3. That is, sintered body 10 is formed by laminating and firing a ceramic sheet to be layer LY1 to which an electrode material to be second internal electrode 32 is applied, a ceramic sheet to be layer LY2 to which an electrode material to be third internal electrode 33 is applied, a ceramic sheet to be layer LY3 to which an electrode material to be first internal electrode 31 is applied, and a ceramic sheet to be layer LY4. As a result, inside sintered body 10, second internal electrode 32 is provided between layer LY1 and layer LY2, third internal electrode 33 is provided between layer LY2 and layer LY3, and first internal electrode 31 is provided between layer LY3 and layer LY4.

As described above, first internal electrode 31 includes first facing part 311 and first connecting part 312. First facing part 311 is formed in a rectangular plate shape, and first facing part 311 is disposed such that a longitudinal direction thereof is along the first direction. First connecting part 312 protrudes leftward along the first direction from one end side (left side) of first facing part 311 in the first direction. As described above, first connecting part 312 includes first connection portion 313 and first narrow part 314. First connection portion 313 is a connection portion of first connecting part 312 with first external electrode 21. First connection portion 313 is formed in a rectangular shape whose longitudinal direction is the second direction. An end surface on a left side of first connection portion 313 is exposed to first end surface 11 of sintered body 10. First narrow part 314 is formed in a rectangular shape whose longitudinal direction is the first direction, and dimension D2 of first narrow part 314 in the second direction is smaller than dimension D1 of first connection portion 313 in the second direction. Note that, in the present exemplary embodiment, dimension D1 of first connection portion 313 is smaller than dimension D3 of first facing part 311 in the second direction.

As described above, second internal electrode 32 includes second facing part 321 and second connecting part 322 (see FIG. 4). Second facing part 321 is formed in a rectangular plate shape, and second facing part 321 is disposed such that the longitudinal direction is along the first direction. Second connecting part 322 protrudes rightward along the first direction from one end side (right side) of second facing part 321 in the first direction. As described above, second connecting part 322 includes second connection portion 323 and second narrow part 324. Second connection portion 323 is a connection portion of second connecting part 322 with second external electrode 22. Second connection portion 323 is formed in a rectangular shape with the second direction as the longitudinal direction. An end surface on a right side of second connection portion 323 is exposed to second end surface 12 of sintered body 10. Second narrow part 324 is formed in a rectangular shape with the second direction as the longitudinal direction, and dimension D5 of second narrow part 324 in the second direction is smaller than dimension D4 of second connection portion 323 in the second direction. Note that, in the present exemplary embodiment, dimension D4 of second connection portion 323 is smaller than dimension D6 of second facing part 321 in the second direction.

Third internal electrode 33 includes third facing part 331 facing first facing part 311 and second facing part 321 in the third direction, and third connecting part 332 connecting third facing part 331 and third external electrode 23. Third facing part 331 is positioned between first facing part 311 and second facing part 321. Note that, an area of third facing part 331 is larger than areas of first facing part 311 and second facing part 321, and third facing part 331 covers the whole of each of first facing part 311 and second facing part 321 as viewed from the third direction.

In the present exemplary embodiment, since two third external electrodes 23 are provided on first side surface 13 and second side surface 14, third internal electrode 33 has two third connecting parts 332 that connect two third external electrodes 23 and third facing part 331. Each of two third connecting parts 332 includes third connection portion 333 connected to third external electrode 23 and third narrow part 334 having a smaller dimension in the first direction than third connection portion 333. That is, dimension D8 of third narrow part 334 in the first direction is smaller than dimension D7 of third connection portion 333 in the first direction.

As described above, in third connecting part 332 of third internal electrode 33, a width of third narrow part 334 connecting third connection portion 333 and third facing part 331 is narrower than a width of third connection portion 333. As a result, as compared with a case where third narrow part 334 is not provided, it is possible to reduce a change in electrostatic capacitance between first internal electrode 31 and third internal electrode 33 caused by a dimensional error or the like at the time of manufacture. Further, it is possible to reduce a change in electrostatic capacitance between second internal electrode 32 and third internal electrode 33 caused by a dimensional error or the like at the time of manufacture. Accordingly, it is possible to reduce a change in electrostatic capacitance between first external electrode 21 and third external electrode 23 and a change in electrostatic capacitance between second external electrode 22 and third external electrode 23 caused by a dimensional error or the like at the time of manufacture.

In addition, in third connecting part 332 of third internal electrode 33, since dimension D7 of third connection portion 333 in the first direction is larger than dimension D8 of third narrow part 334 in the first direction, there is an advantage that stability of connection between third internal electrode 33 and third external electrode 23 is improved as compared with a case where third narrow part 334 is connected to third external electrode 23. Note that, in the present exemplary embodiment, dimension D7 of third connection portion 333 is smaller than dimension D9 of third facing part 331 in the first direction.

First external electrode 21 is provided on first end surface 11 of sintered body 10. First external electrode 21 is provided over entire first end surface 11, and is provided from first end surface 11 to a part (left end) of first side surface 13 and second side surface 14 and a part (left end) of first principal surface 15 and second principal surface 16. First external electrode 21 is connected to an end surface of first connecting part 312 (specifically, first connection portion 313) exposed to first end surface 11, and first external electrode 21 is electrically connected to first internal electrode 31.

Second external electrode 22 is provided on second end surface 12 of sintered body 10. Second external electrode 22 is provided on entire second end surface 12, and is provided from second end surface 12 to a part (right end) of first side surface 13 and second side surface 14 and a part (right end) of first principal surface 15 and second principal surface 16. Second external electrode 22 is connected to an end surface of second connecting part 322 (specifically, second connection portion 323) exposed to second end surface 12, and second external electrode 22 is electrically connected to second internal electrode 32.

On first side surface 13 and second side surface 14 of sintered body 10, a pair of third external electrodes 23 is provided at a central portion in the first direction. One of the pair of third external electrodes 23 is provided from an upper end to a lower end of a central portion of first side surface 13 in the longitudinal direction, and an upper end and a lower end of third external electrode 23 are provided over a part (front end) of first principal surface 15 and second principal surface 16. In addition, the other of the pair of third external electrodes 23 is provided from an upper end to a lower end of the central portion of second side surface 14 in the longitudinal direction, and an upper end and a lower end of third external electrode 23 are provided over a part (rear end) of first principal surface 15 and second principal surface 16. Third external electrode 23 provided on first side surface 13 is connected to an end surface of third connecting part 332 (specifically, third connection portion 333) exposed on first side surface 13, and third external electrode 23 provided on first side surface 13 is electrically connected to third internal electrode 33. Third external electrode 23 provided on second side surface 14 is connected to an end surface of third connecting part 332 (specifically, third connection portion 333) exposed on second side surface 14, and third external electrode 23 provided on second side surface 14 is electrically connected to third internal electrode 33. As described above, the pair of third external electrodes 23 is electrically connected to third internal electrode 33.

First to third external electrodes 21 to 23 preferably include, for example, a primary electrode formed on a front surface of sintered body 10 and a plating electrode formed on the primary electrode. First to third external electrodes 21 to 23 may further include a secondary electrode formed on the primary electrode to cover the primary electrode. The primary electrode is formed to cover a part of the front surface of sintered body 10. The primary electrode preferably contains a metal as a main component, and more preferably contains silver as the main component. The primary electrode contains, for example, a metal such as Ag, AgPd, or AgPt as the main component, and preferably contains a glass component such as $Bi_2O_3$, $SiO_2$, or $B_2O_5$. Note that, the primary electrode is formed, for example, by applying a paste-shaped metal material for forming the primary electrode to a part of the front surface of sintered body 10. In addition, the plating electrode is provided to cover at least a part of the primary electrode. The plating electrode preferably includes, for example, a Ni electrode provided to cover the primary electrode or at least a part of the secondary electrode provided on the primary electrode, and a Sn electrode provided to cover at least a part of the Ni electrode.

Laminated varistor 1 of the present exemplary embodiment includes first varistor B1 formed between first external electrode 21 and third external electrode 23, and second varistor B2 formed between second external electrode 22 and third external electrode 23. An electrostatic capacitance of each of first varistor B1 and second varistor B2 is preferably less than or equal to 200 pF, and a difference (absolute value) between the electrostatic capacitance of first varistor B1 and the electrostatic capacitance of second varistor B2 is preferably less than or equal to 20% of the electrostatic capacitance of first varistor B1. As a result, laminated varistor 1 of the present exemplary embodiment for a circuit through which a high-frequency signal flows is used, and thus, high-frequency noise can be suppressed. Laminated varistor 1 of the present exemplary embodiment is preferably connected, for example, between a transmission path to which a communication IC that performs high frequency communication is connected and a ground of a circuit, and can suppress crosstalk and improve communication quality.

(3) Method for Manufacturing Laminated Varistor

Hereinafter, an example of a method for manufacturing laminated varistor 1 of the present exemplary embodiment will be described. Note that, the method for manufacturing laminated varistor 1 is not limited to the following manufacturing method, and can be appropriately changed.

The method for manufacturing laminated varistor 1 includes, for example, a first step, a second step, and a third step. Hereinafter, the steps will be described in detail.

[First Step]

In the first step, sintered body 10 containing ZnO as a main component and having first to third internal electrodes 31 to 33 disposed therein is prepared.

A plurality of ceramic sheets are prepared by using a slurry containing ZnO. An internal electrode paste to be second internal electrode 32 is applied to a front surface of the ceramic sheet to be layer LY1 among the plurality of ceramic sheets. An internal electrode paste to be third internal electrode 33 is applied to a front surface of the ceramic sheet to be layer LY2. An internal electrode paste to be first internal electrode 31 is applied to a front surface of the ceramic sheet to be layer LY3. Note that, each of the internal electrode pastes to be first to third internal electrodes 31 to 33 is patterned into a desired shape. Then, after laminating, pressing, and cutting the plurality of ceramic sheets, sintered body 10 is prepared by performing debinding and firing.

Note that, the slurry for forming the ceramic sheet can be prepared, for example, by mixing ZnO as a main raw material, at least one of $Bi_2O_3$, $CO_2O_3$, $MnO_2$, $Sb_2O_3$, $Pr_6O_{11}$, $Co_2O_3$, $CaCO_3$, and $Cr_2O_3$ as a sub-raw material, and a binder.

For example, an Ag paste, a Pd paste, a Pt paste, a PdAg paste, a PtAg paste, or the like can be used as the internal electrode paste.

A temperature at which debinding is performed is, for example, between 300° C. and 500° ° C. inclusive. A temperature at which firing is performed can be appropriately adjusted depending on a configuration, a composition, and the like of sintered body 10 to be obtained, and is, for example, between 800° C. and 1300° C. inclusive.

The first step includes, for example, a coating step, an internal electrode applying step, a laminating step, a cutting step, and a firing step. In the coating step, the ceramic sheet containing ZnO as a main component is produced. In the internal electrode applying step, the internal electrode paste is applied to the front surface of the ceramic sheet. Examples of the applying method in the internal electrode applying step include a printing method. In the laminating step, a laminate is obtained by laminating the ceramic sheet to which the internal electrode paste is applied and the ceramic sheet to which the internal electrode paste is not applied. In the cutting step, the laminate is cut to obtain a laminated body having a lamination surface (first principal surface 15 and second principal surface 16) and a cut surface (first end surface 11, second end surface 12, first side surface 13, and second side surface 14). In the firing step, the laminated body is fired to obtain sintered body 10.

By such a method, it is possible to produce sintered body 10 having first principal surface 15 and second principal surface 16 facing each other, first side surface 13 and second side surface 14 facing each other, and first end surface 11 and second end surface 12 facing each other.

Note that, in the first step, a high-resistance layer having a resistance higher than a resistance of sintered body 10 may be formed to cover at least a part of sintered body 10. Examples of the method for forming the high-resistance layer include (i) a method for applying a solution containing a precursor of the high-resistance layer to sintered body 10. (ii) a method for reacting $SiO_2$ with sintered body 10 containing ZnO as the main component, and (iii) a method for thermally diffusing an alkali metal into sintered body 10.

[Second Step]

In the second step, a primary electrode paste to be the first to third external electrodes 21 to 23 is applied to cover a part of the high-resistance layer and to come into contact with each of first to third internal electrodes 31 to 33.

The primary electrode paste can be prepared by mixing a metal component containing, for example, Ag powder, AgPd powder, AgPt powder, or the like, a glass component containing $Bi_2O_3$, $SiO_2$, $B_2O_5$, or the like, and a solvent. In addition, a paste containing Ag as a main component and containing a resin component or the like can also be used as the primary electrode paste. The primary electrode paste is baked at a temperature between 700° C. and 800° ° C. inclusive after applying the primary electrode paste, and thus, it is possible to promote alloying of the primary electrode paste to be first external electrode 21 with first internal electrode 31, alloying of the primary electrode paste to be second external electrode 22 with second internal electrode 32, and alloying of the primary electrode paste to be third external electrode 23 with third internal electrode 33. Accordingly, it is possible to form a primary electrode with improved adhesion.

[Third Step]

In the third step, the plating electrode is formed to cover at least a part of the primary electrode formed from the primary electrode paste. As a result, external electrodes (first to third external electrodes 21 to 23) having the primary electrode and the plating electrode formed on the primary electrode can be formed. Note that, examples of the method for forming the plating electrode include a method for sequentially performing Ni plating and Sn plating by an electrolytic plating method.

(4) Modifications

The above exemplary embodiment is merely one of various exemplary embodiments of the present disclosure. The above exemplary embodiment can be variously changed in accordance with design and the like as long as the object of the present disclosure can be achieved.

Modifications of the above exemplary embodiment will be listed below. The modifications to be described below can be applied in appropriate combination. In addition, in the modifications to be described below, the same reference numerals are given to the components common to the above exemplary embodiment, and the description thereof will be omitted.

(4.1) First Modification

Figure 5:
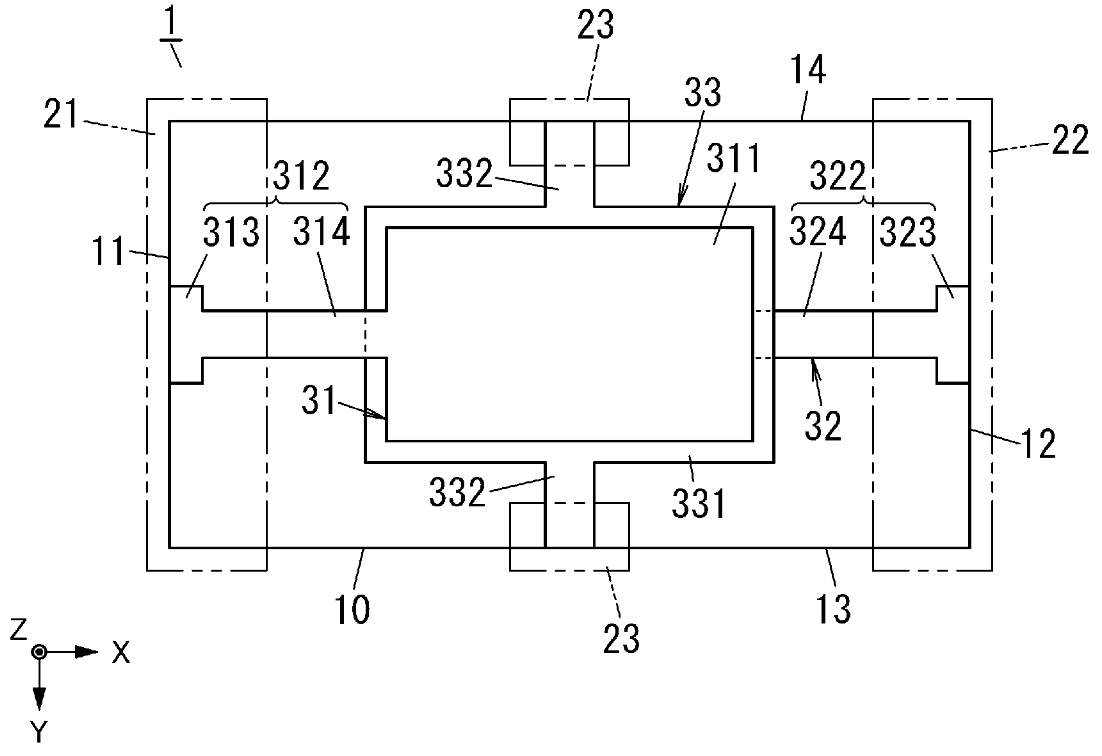
FIG. 5 is a transparent view of a laminated varistor according to a first modification of the exemplary embodiment from above.

Laminated varistor 1 according to a first modification of the above exemplary embodiment will be described with reference to FIG. 5. Laminated varistor 1 according to the first modification is different from laminated varistor 1 of the above exemplary embodiment in that third connecting part 332 of third internal electrode 33 is formed in a rectangular plate shape. Since laminated varistor 1 of the first modification is similar to laminated varistor 1 of the above exemplary embodiment except for the shape of third connecting part 332, the same reference numerals are given to the components common to laminated varistor 1 of the above exemplary embodiment, and the description thereof will be omitted.

Third connecting part 332 is formed in a rectangular plate shape. The end surface of third connecting part 332 is exposed to the side surface (first side surface 13 or second side surface 14) of sintered body 10, and is connected to third external electrode 23. In laminated varistor 1 of the first modification, a narrow part having a smaller dimension in the first direction than the connection portion connected to third external electrode 23 is not provided at third connecting part 332.

Note that, in laminated varistor 1 of the above exemplary embodiment, first connecting part 312 and second connecting part 322 may be formed in a rectangular plate shape.

(4.2) Second Modification

Laminated varistor 1 according to a second modification of the above exemplary embodiment will be described with reference to FIG. 6. In laminated varistor 1 according to the second modification, in each of first connection portion 313 of first internal electrode 31 and second connection portion 323 of second internal electrode 32, shapes of corner portions 317, 327 facing third internal electrode 33 or third external electrode 23 as viewed from the third direction are a chamfered shape in which corners of the corner portions 317, 327 are chamfered shapes. In addition, in third connection portion 333 of third internal electrode 33, a shape of corner portion 337 facing first facing part 311 of first internal electrode 31 or second facing part 321 of second internal electrode 32 as viewed from the third direction is a chamfered shape in which a corner of corner portion 337 is a chamfered shape. Since laminated varistor 1 of the second modification is similar to laminated varistor 1 of the above exemplary embodiment except for the shapes of first connection portion 313, second connection portion 323, and third connection portion 333, the same reference numerals are given to the components common to laminated varistor 1 of the above exemplary embodiment, and the description thereof will be omitted.

In first connection portion 313 of first internal electrode 31, corner portion 317 facing third internal electrode 33 or third external electrode 23 includes two corner portions of first connection portion 313 closer to first facing part 311. In addition, a case where the shape of corner portion 317 is the “chamfered shape” means a C-chamfered shape in which each of two corner portions is cut off on a plane obliquely intersecting two sides forming each of two corner portions or an R-chamfered shape in which an angle formed by two sides is rounded.

In second connection portion 323 of second internal electrode 32, corner portion 327 facing third internal electrode 33 or third external electrode 23 includes two corner portions of second connection portion 323 closer to second facing part 321. In addition, a case where the shape of corner portion 327 is the “chamfered shape” means a C-chamfered shape in which each of two corner portions is cut off on a plane obliquely intersecting two sides forming each of two corner portions or an R-chamfered shape in which an angle formed by two sides is rounded.

In third connection portion 333 of third internal electrode 33, corner portion 337 facing first facing part 311 of first internal electrode 31 or second facing part 321 of second internal electrode 32 includes two corner portions of third connection portion 333 closer to first facing part 311 or second facing part 321. A case where the shape of corner portion 337 is the “chamfered shape” means a C-chamfered shape in which each of two corner portions is cut off on a plane obliquely intersecting two sides forming each of two corner portions or an R-chamfered shape in which an angle formed by two sides is rounded.

Figure 6:
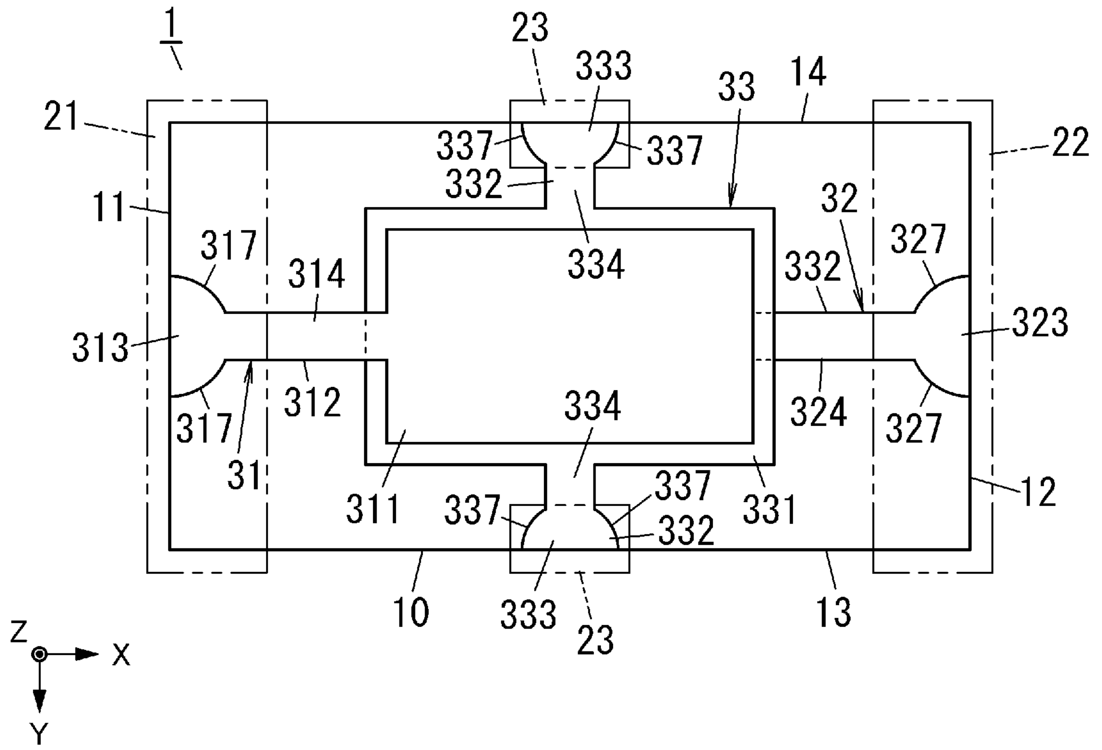
FIG. 6 is a transparent view of a laminated varistor according to a second modification of the exemplary embodiment from above.

Laminated varistor 1 of the second modification illustrated in FIG. 6 is an example in which corner portion 317 of first internal electrode 31, corner portion 327 of second internal electrode 32, and corner portion 337 of third internal electrode 33 each have the R-chamfered shape. As described above, corner portion 317 of first internal electrode 31 and corner portion 327 of second internal electrode 32 are formed into the chamfered shapes, and thus, the electrostatic capacitance formed between each of first connection portion 313 and second connection portion 323 and third external electrode 23 can be reduced. Accordingly, the occurrence of crosstalk can be suppressed. In addition, corner portion 337 of third internal electrode 33 is formed in the chamfered shape, and thus, the electrostatic capacitance formed between third connection portion 333 and first external electrode 21 or second external electrode 22 can be reduced. Accordingly, the occurrence of crosstalk can be suppressed.

Figure 7:
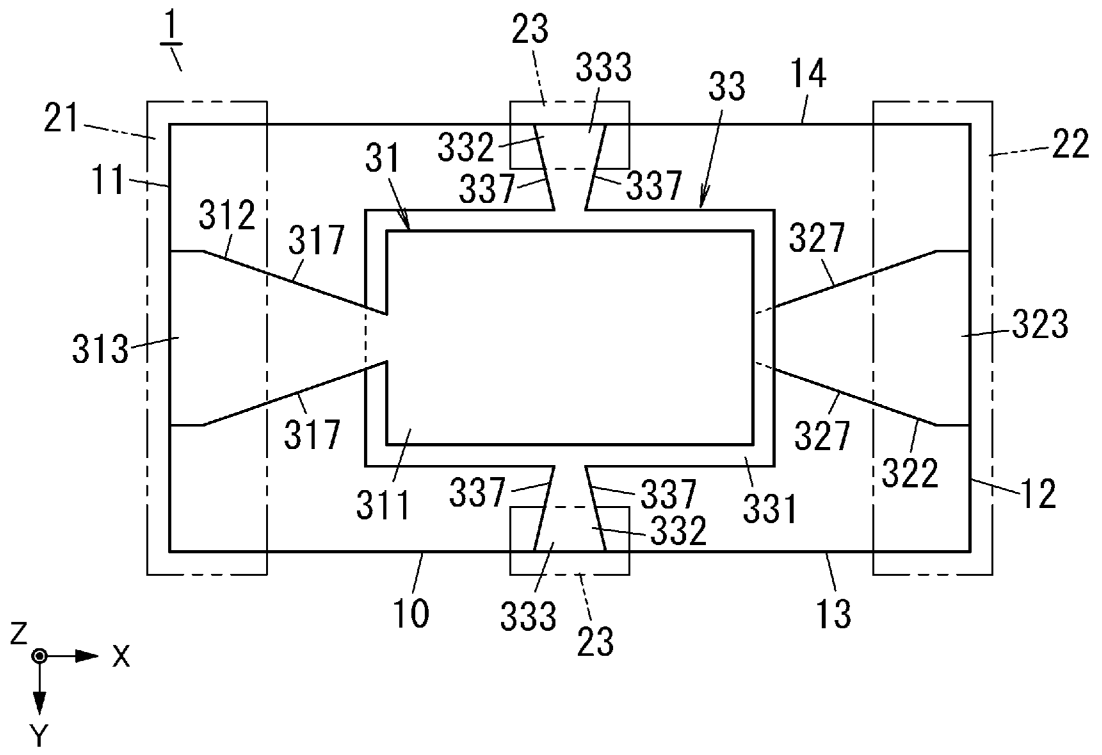
FIG. 7 is a transparent view of the laminated varistor according to the second modification of the exemplary embodiment from above.

Note that, the chamfered shapes provided at corner portions 317, 327, 337 of first internal electrode 31, second internal electrode 32, and third internal electrode 33 are not limited to the R-chamfered shape, and can be appropriately changed. For example, as illustrated in FIG. 7, the shape of each of corner portions 317, 327, 337 as viewed from the third direction may be the C-chamfered shape.

(4.3) Third Modification

Figure 8:
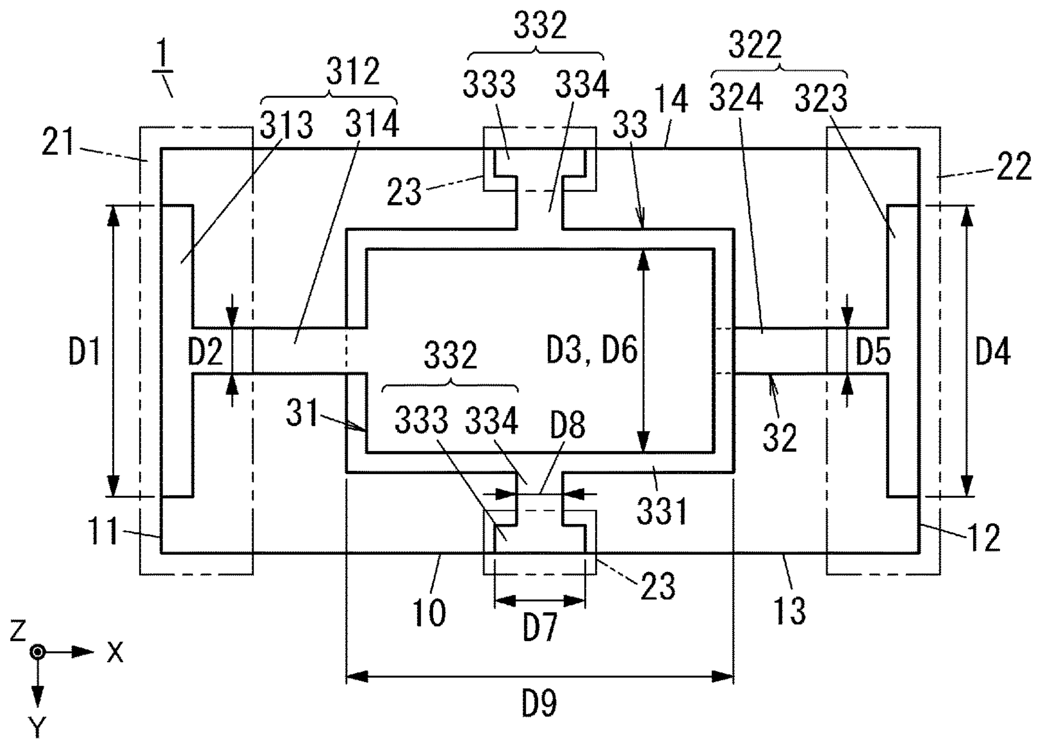
FIG. 8 is a transparent view of a laminated varistor according to a third modification of the exemplary embodiment from above.

Laminated varistor 1 according to a third modification of the above exemplary embodiment will be described with reference to FIG. 8. Since laminated varistor 1 of the third modification is similar to laminated varistor 1 of the above exemplary embodiment except for first connection portion 313 and second connection portion 323, the same reference numerals are given to the components common to laminated varistor 1 of the above exemplary embodiment, and the illustration and description thereof are omitted.

In laminated varistor 1 according to the third modification, dimension D1 of first connection portion 313 is larger than dimension D3 of first facing part 311 in the second direction, and dimension D4 of second connection portion 323 is larger than dimension D6 of second facing part 321 in the second direction.

In the third modification, since dimension D1 of first connection portion 313 is larger than dimension D3 of first facing part 311 in the second direction, there is an advantage that a connection state between first internal electrode 31 and first external electrode 21 is stabilized as compared with a case where dimension D1 is smaller than dimension D3. Note that, in the second direction, since dimension D2 of first narrow part 314 is smaller than dimension D3 of first facing part 311, crosstalk can be reduced.

In addition, since dimension D4 of second connection portion 323 is larger than dimension D6 of second facing part 321 in the second direction, there is an advantage that a connection state between second internal electrode 32 and second external electrode 22 is stabilized as compared with a case where dimension D4 is smaller than dimension D6. Note that, in the second direction, since dimension D5 of second narrow part 324 is smaller than dimension D6 of second facing part 321, crosstalk can be reduced.

(4.4) Fourth Modification

Laminated varistor 1 according to a fourth modification of the above exemplary embodiment will be described with reference to FIG. 9. In laminated varistor 1 according to the fourth modification, first connecting part 312 is connected to first external electrode 21 via a plurality of (for example, two) first branch parts 315, 316 obtained by being divided into a plurality of portions in the second direction. First connection portion 313 includes a plurality of connection portions 313A, 313B where the plurality of first branch parts 315, 316 are connected to first external electrode 21. In addition, second connecting part 322 is connected to second external electrode 22 via a plurality of (for example, two) second branch parts 325, 326 obtained by being divided into a plurality of portions in the second direction. Second connection portion 323 includes a plurality of connection portions 323A, 323B where the plurality of second branch parts 325, 326 are connected to second external electrode 22. In addition, third connecting part 332 is connected to third external electrode 23 via a plurality of (for example, two) third branch parts 335, 336 obtained by being divided into a plurality of portions in the first direction. Third connection portion 333 includes a plurality of connection portions 333A, 333B where the plurality of third branch parts 335, 336 are connected to third external electrode 23. Note that, since laminated varistor 1 according to the fourth modification is similar to the above-described exemplary embodiment except for the shapes of first connecting part 312, second connecting part 322, and third connecting part 332, the same reference numerals are given to the components common to the above-described exemplary embodiment, and the description thereof will be omitted.

Here, since the dimension of first narrow part 314 in the second direction is smaller than dimension D1 of first connection portion 313 in the second direction (dimension of a portion not branched into a plurality of portions), crosstalk generated between first varistor B1 and second varistor B2 can be reduced. In addition, first connection portion 313 is connected to first external electrode 21 at the plurality of connection portions 313A, 313B, and a total dimension of the plurality of connection portions 313A, 313B in the second direction is larger than the dimension of first narrow part 314 in the second direction. As a result, the connection between first internal electrode 31 and first external electrode 21 is stabilized as compared with a case where first connection portion 313 and first external electrode 21 are connected at one place.

In addition, since dimension D5 of second narrow part 324 in the second direction is smaller than dimension D4 of second connection portion 323 in the second direction (dimension of a portion not branched into a plurality of portions), crosstalk generated between first varistor B1 and second varistor B2 can be reduced. In addition, second connection portion 323 is connected to second external electrode 22 at the plurality of connection portions 323A, 323B, and a total dimension of the plurality of connection portions 323A. 323B in the second direction is larger than the dimension of second narrow part 324 in the second direction. As a result, the connection between second internal electrode 32 and second external electrode 22 is stabilized as compared with a case where second connection portion 323 and second external electrode 22 are connected at one place.

In addition, since dimension D8 of third narrow part 334 in the first direction is smaller than dimension D7 of third connection portion 333 in the first direction (dimension of a portion not branched into a plurality of portions), crosstalk generated between first varistor B1 and second varistor B2 can be reduced. In addition, third connection portion 333 is connected to third external electrode 23 at the plurality of connection portions 333A. 333B, and a total dimension of the plurality of connection portions 333A, 333B in the second direction is larger than the dimension of third narrow part 334 in the first direction. As a result, the connection between third internal electrode 33 and third external electrode 23 is stabilized as compared with a case where third connection portion 333 and third external electrode 23 are connected at one place.

Figure 10:
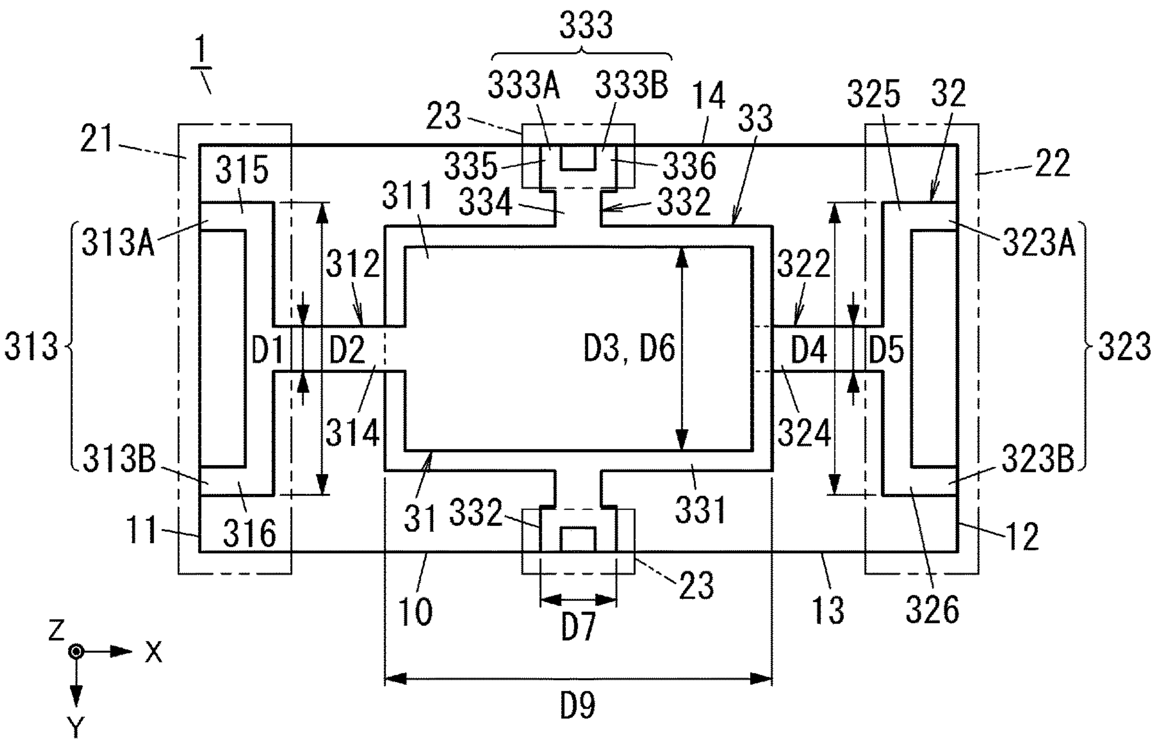
FIG. 10 is a transparent view of a laminated varistor according to a fourth modification of the exemplary embodiment from above.

Note that, as illustrated in FIG. 10, first internal electrode 31 and second internal electrode 32 may be formed such that dimension D1 of first connection portion 313 is larger than dimension D3 of first facing part 311 in the second direction and dimension D4 of second connection portion 323 is larger than dimension D6 of second facing part 321 in the second direction. As a result, there is an advantage that the connection state between first internal electrode 31 and first external electrode 21 is stabilized and the connection state between second internal electrode 32 and second external electrode 22 is stabilized.

Figure 9:
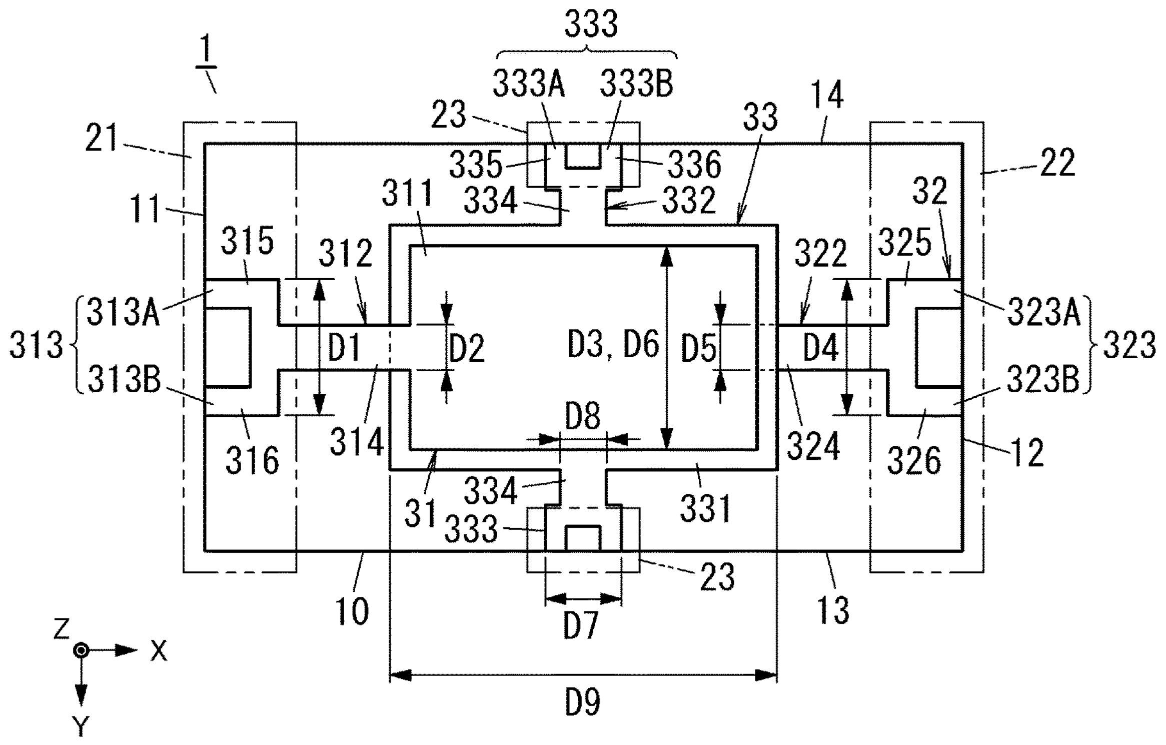
FIG. 9 is a transparent view of a laminated varistor according to a fourth modification of the exemplary embodiment from above.
Figure 11:
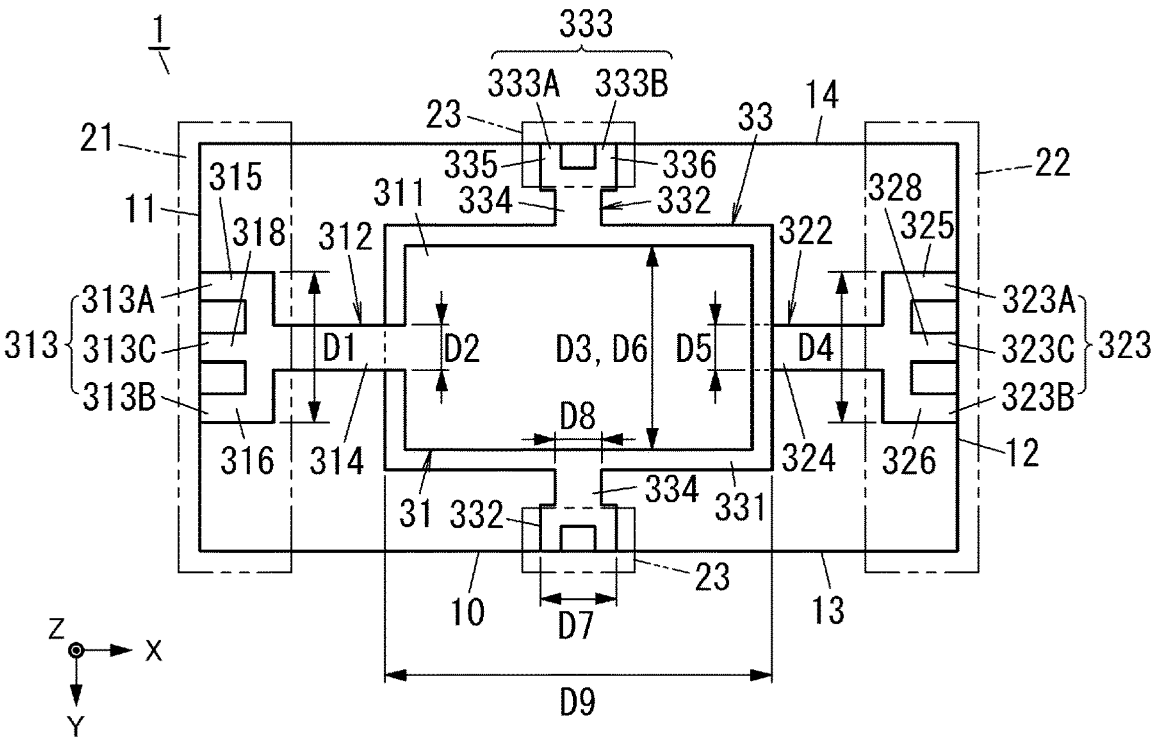
FIG. 11 is a transparent view of a laminated varistor according to the fourth modification of the exemplary embodiment from above.

In addition, in the example of FIG. 9, although first connecting part 312 is branched into two first branch parts 315, 316 and second connecting part 322 is branched into two second branch parts 325, 326, first connecting part 312 and second connecting part 322 may be branched into three or more in the second direction. For example, in laminated varistor 1 illustrated in FIG. 11, first connecting part 312 is branched into three first branch parts 315, 316, 318, and first connection portion 313 includes three connection portions 313A, 313B, 313C where three first branch parts 315, 316, 318 are connected to first external electrode 21. In addition, second connecting part 322 is branched into three second branch parts 325, 326, 328, and second connection portion 323 includes three connection portions 323A, 323B, 323C where three second branch parts 325, 326, 328 are connected to second external electrode 22.

Figure 12:
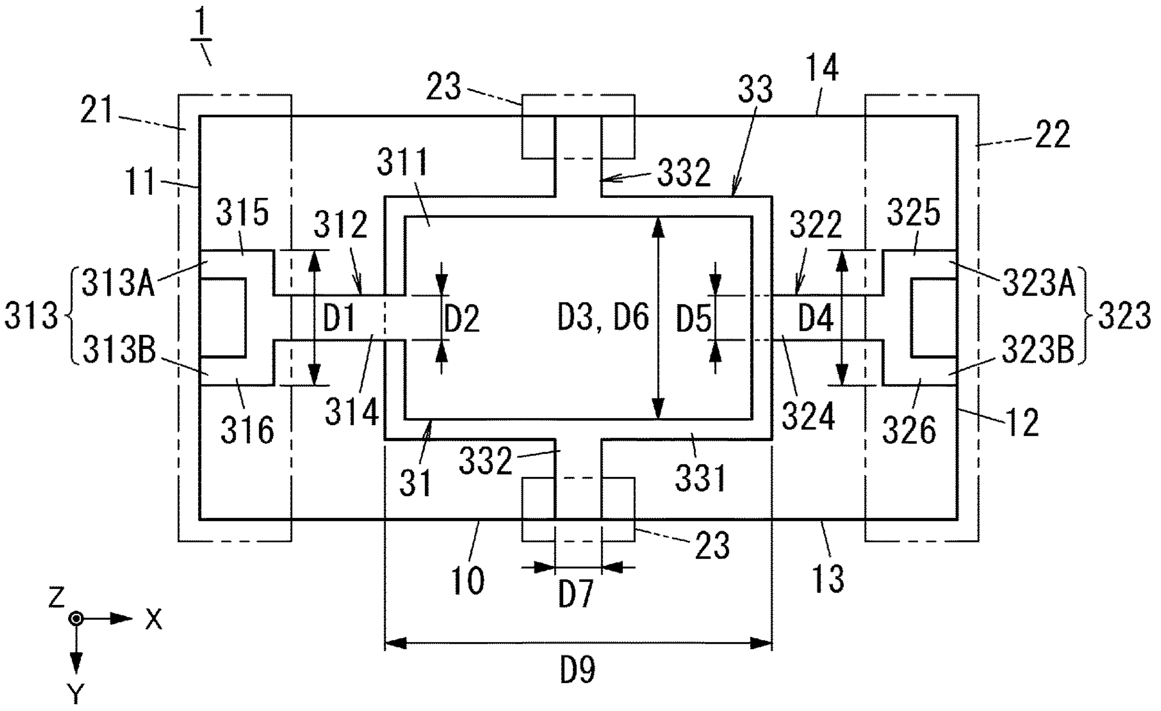
FIG. 12 is a transparent view of a laminated varistor according to the fourth modification of the exemplary embodiment from above.

Note that, in the example of FIG. 9, although third connecting part 332 is branched into two third branch parts 335, 336, third connecting part 332 may be branched into three or more, or may be formed in a rectangular shape without branching as illustrated in FIG. 12.

(4.5) Fifth Modification

Laminated varistor 1 according to a fifth modification of the above exemplary embodiment will be described with reference to FIG. 13. Laminated varistor 1 according to the fifth modification is different from laminated varistor 1 according to the fourth modification in that, in each of first connection portion 313 of first internal electrode 31 and second connection portion 323 of second internal electrode 32, shapes of corner portions 317, 327 facing third internal electrode 33 or third external electrode 23 as viewed from the third direction are chamfered shape in which corners of corner portions 317, 327 are chamfered shapes. Note that, since laminated varistor 1 according to the fifth modification is similar to laminated varistor 1 according to the fourth modification except for the shapes of corner portions 317, 327, the same reference numerals are given to the components common to laminated varistor 1 according to the fourth modification, and the description thereof will be omitted.

In first connection portion 313 of first internal electrode 31, corner portion 317 facing third internal electrode 33 or third external electrode 23 includes two corner portions of first connection portion 313 closer to third facing part 331. A case where the shape of corner portion 317 is the "chamfered shape" means a C-chamfered shape in which each of two corner portions is cut off on a plane obliquely intersecting two sides forming each of two corner portions or an R-chamfered shape in which an angle formed by two sides is rounded.

In addition, in second connection portion 323 of second internal electrode 32, corner portion 327 facing third internal electrode 33 or third external electrode 23 includes two corner portions of second connection portion 323 closer to third facing part 331. A case where the shapes of two corner portions which are corner portions 327 are the "chamfered shapes" means that two corner portions have a C-chamfered shape in which each of two corner portions is cut off on a plane obliquely intersecting two sides forming each of two corner portions or an R-chamfered shape in which corners formed by two sides are rounded.

Figure 13:
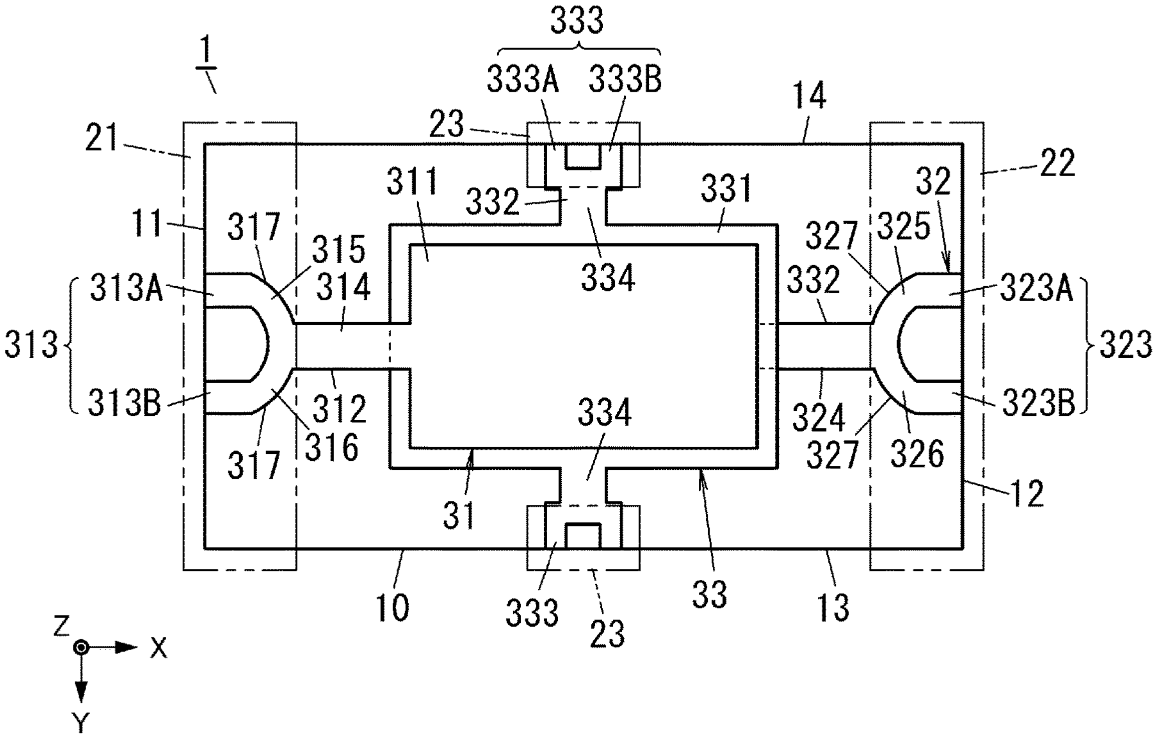
FIG. 13 is a transparent view of a laminated varistor according to a fifth modification of the exemplary embodiment from above.

Laminated varistor 1 of the fifth modification illustrated in FIG. 13 is an example in which corner portion 317 of first internal electrode 31 and corner portion 327 of second internal electrode 32 have R-chamfered shapes. As described above, corner portion 317 of first internal electrode 31 and corner portion 327 of second internal electrode 32 are formed into chamfered shapes, and thus, the electrostatic capacitance formed between each of first internal electrode 31 and second internal electrode 32 and third internal electrode 33 can be reduced. As a result, in laminated varistor 1 of the fifth modification, the crosstalk generated between first internal electrode 31 and second internal electrode 32, and third external electrode 23 can be reduced.

Note that, the chamfered shapes provided at corner portions 317, 327 of first internal electrode 31 and second internal electrode 32 are not limited to the R-chamfered shapes, and can be appropriately changed. The shape of each of corner portion 317 of first internal electrode 31 and corner portion 327 of second internal electrode 32 as viewed from the third direction may be the C-chamfered shape.

(4.6) Sixth Modification

Laminated varistor 1 according to a sixth modification of the above exemplary embodiment will be described with reference to FIG. 14.

Figure 14:
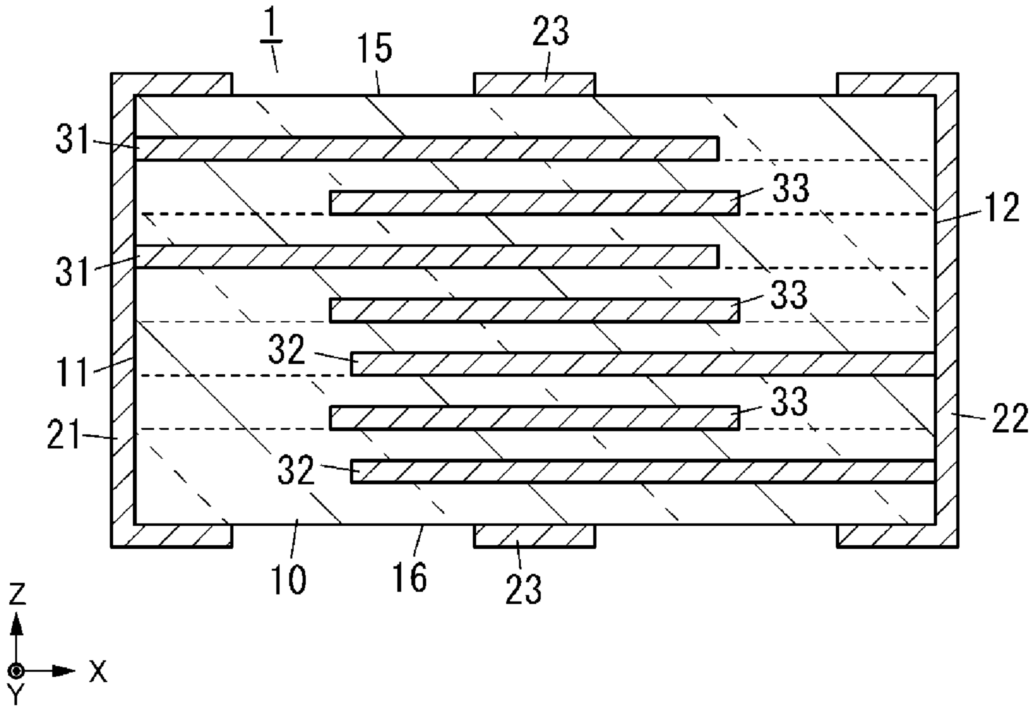
FIG. 14 is a cross-sectional view of a laminated varistor according to a sixth modification of the exemplary embodiment.

In laminated varistor 1 of the above exemplary embodiment and the first to fifth modifications, although the layer in which first internal electrode 31 and third internal electrode 33 face each other and the layer in which second internal electrode 32 and third internal electrode 33 face each other are each one layer, in laminated varistor 1 of the sixth modification, these layers face each other in multiple layers as illustrated in FIG. 14. Note that, since laminated varistor 1 according to the sixth modification is similar to the above exemplary embodiment except that the layer in which first internal electrode 31 and third internal electrode 33 face each other and the layer in which second internal electrode 32 and third internal electrode 33 face each other are multiple layers, the same reference numerals are given to the components common to the above exemplary embodiment, and the description thereof will be omitted.

In laminated varistor 1 of the sixth modification, two first internal electrodes 31 disposed at an interval in the second direction and two second internal electrodes 32 disposed at an interval in the second direction are provided inside sintered body 10. Inside sintered body 10, third internal electrodes 33 are provided between two first internal electrodes 31, between two second internal electrodes 32, and between first internal electrode 31 on a lower side and second internal electrode 32 on an upper side. As a result, the layer in which first internal electrode 31 and third internal electrode 33 face each other and the layer in which second internal electrode 32 and third internal electrode 33 face each other are multiple layers (two layers in the example of FIG. 14).

As a result, a facing area between first internal electrode 31 and third internal electrode 33 and a facing area between second internal electrode 32 and third internal electrode 33 are increased, and performance as the varistor can be improved. In addition, the layer in which first internal electrode 31 and third internal electrode 33 face each other and the layer in which second internal electrode 32 and third internal electrode 33 face each other are multiple layers, and thus, the dimension of sintered body 10 in the first direction and the dimension in the second direction can be reduced.

Note that, the plurality of layers in which first internal electrode 31 and third internal electrode 33 face each other are preferably disposed at positions close to one (for example, first principal surface 15) of first principal surface 15 and the second principal surface 16. In addition, the plurality of layers in which second internal electrode 32 and third internal electrode 33 face each other are preferably disposed at positions close to the other (for example, second principal surface 16) of first principal surface 15 and second principal surface 16. With such a disposition, crosstalk can be further suppressed.

(4.7) Other Modifications

The shape of sintered body 10, the shapes and disposition of first to third external electrodes 21 to 23, and the shape and disposition of first to third internal electrodes 31 to 33 described in the above exemplary embodiment and the first to sixth modifications are examples, and can be appropriately changed.

In the above exemplary embodiment and the first to sixth modifications, although the pair of third external electrodes 23 is formed on both first side surface 13 and second side surface 14, third external electrode 23 may be formed on either one of first side surface 13 and second side surface 14. In this case, third internal electrode 33 may include one third connecting part 332 connecting third external electrode 23 formed on either one of first side surface 13 and second side surface 14 and third facing part 331.

CONCLUSION

The following aspects are disclosed based on the exemplary embodiment and the like described above.

Laminated varistor (1) according to a first aspect includes sintered body (10), first internal electrode (31), second internal electrode (32), third internal electrode (33), first external electrode (21), second external electrode (22), and third external electrode (23). Sintered body (10) includes first end surface (11) and second end surface (12) facing cach other in a first direction, first side surface (13) and second side surface (14) facing cach other in a second direction intersecting the first direction, and first principal surface (15) and second principal surface (16) facing each other in a third direction intersecting the first direction and the second direction. Sintered body (10) has a laminated structure in which a plurality of layers are laminated along the third direction. First internal electrode (31) is provided on a predetermined lamination surface in sintered body (10), and extends along the first direction. Second internal electrode (32) is provided on a lamination surface different from first internal electrode (31) in sintered body (10), and extends along the first direction. Third internal electrode (33) is provided on a lamination surface different from first internal electrode (31) and second internal electrode (32) in sintered body (10), and extends in the second direction. First external electrode (21) is provided on first end surface (11) and is connected to first internal electrode (31). Second external electrode (22) is provided on second end surface (12) and is connected to second internal electrode (32). Third external electrode (23) is provided on at least one of first side surface (13) and second side surface (14), and is connected to third internal electrode (33). First internal electrode (31) includes first facing part (311) facing third internal electrode (33) in the third direction, and first connecting part (312) connecting first facing part (311) and first external electrode (21). Second internal electrode (32) includes second facing part (321) facing third internal electrode (33) in the third direction, and second connecting part (322) connecting second facing part (321) and second external electrode (22). Third internal electrode (33) is disposed between first facing part (311) and second facing part (321). First connecting part (312) includes first connection portion (313) connected to first external electrode (21) and first narrow part (314) having a dimension in the second direction smaller than first connection portion (313). Second connecting part (322) includes second connection portion (323) connected to second external electrode (22) and second narrow part (324) having a dimension in the second direction smaller than second connection portion (323).

According to this aspect, as compared with a case where first narrow part (314) and second narrow part (324) are not provided, an electrostatic capacitance generated between first internal electrode (31) and third internal electrode (33) and an electrostatic capacitance generated between second internal electrode (32) and third internal electrode (33) can be reduced. Accordingly, the crosstalk generated between two varistors included in laminated varistor (1) can be reduced.

In the first aspect, in laminated varistor (1) according to a second aspect, a dimension of first connection portion (313) is smaller than a dimension of first facing part (311) in the second direction. In the second direction, the dimension of second connection portion (323) is smaller than a dimension of second facing part (321).

According to this aspect, the crosstalk generated between two varistors included in laminated varistor (1) can be reduced.

In the first or second aspect, in laminated varistor (1) according to a third aspect, third internal electrode (33) includes third facing part (331) facing first facing part (311) and second facing part (321) in the third direction, and third connecting part (332) connecting third facing part (331) and third external electrode (23). Third facing part (331) is positioned between first facing part (311) and second facing part (321). Third connecting part (332) includes third connection portion (333) connected to third external electrode (23) and third narrow part (334) having a dimension in the first direction smaller than third connection portion (333).

According to this aspect, as compared with a case where third narrow part (334) is not provided, an electrostatic capacitance generated between first internal electrode (31) and third internal electrode (33) and an electrostatic capacitance generated between second internal electrode (32) and third internal electrode (33) can be reduced. Accordingly, the crosstalk generated between two varistors included in laminated varistor (1) can be reduced.

In the third aspect, in laminated varistor (1) according to a fourth aspect, the dimension of third connection portion (333) is smaller than a dimension of third facing part (331) in the first direction.

According to this aspect, the crosstalk generated between two varistors included in laminated varistor (1) can be reduced.

In any one of the first to fourth aspects, in laminated varistor (1) according to a fifth aspect, first connecting part (312) is connected to first external electrode (21) via a plurality of first branch parts (315, 316, 318) obtained by being divided into a plurality of portions in the second direction. First connection portion (313) includes a plurality of connection portions (313A to 313C) where the plurality of first branch parts (315, 316, 318) are connected to first external electrode (21). Second connecting part (322) is connected to second external electrode (22) via a plurality of second branch parts (325, 326, 328) obtained by being divided into a plurality of parts in the second direction. Second connection portion (323) includes a plurality of connection portions (323A to 323C) where the plurality of second branch parts (325, 326, 328) are connected to second external electrode (22).

According to this aspect, there is an advantage that the stability of the connection between first internal electrode (31) and first external electrode (21) is improved, and the stability of the connection between second internal electrode (32) and second external electrode (221) is improved.

In the third aspect, in laminated varistor (1) according to a sixth aspect, third connecting part (332) is connected to third external electrode (23) via a plurality of third branch parts (335, 336) obtained by being divided into a plurality of portions in the first direction. Third connection portion (333) includes a plurality of connection portions (333A, 333B) where the plurality of third branch parts (335, 336) are connected to third external electrode (23).

According to this aspect, there is an advantage that the stability of the connection between third internal electrode (33) and third external electrode (23) is improved.

In any one of the first to sixth aspects, laminated varistor (1) according to a seventh aspect includes first varistor (B1) disposed between first external electrode (21) and third external electrode (23), and second varistor (B2) disposed between second external electrode (22) and third external electrode (23). An electrostatic capacitance of each of first varistor (B1) and second varistor (B2) is less than or equal to 200 pF. A difference between the electrostatic capacitance of first varistor (B1) and the electrostatic capacitance of second varistor (B2) is less than or equal to 20% of the electrostatic capacitance of first varistor (B1).

According to this aspect, in a case where laminated varistor (1) is applied to a communication circuit, there is an advantage that crosstalk can be suppressed and communication quality can be improved.

The configurations according to the second to sixth aspects are not essential configurations for laminated varistor (1), and can be appropriately omitted.

What is claimed is:

1. A laminated varistor comprising:
a sintered body that includes
a first end surface and a second end surface facing each other in a first direction,
a first side surface and a second side surface facing each other in a second direction intersecting the first direction, and
a first principal surface and a second principal surface facing each other in a third direction intersecting the first direction and the second direction,
the sintered body having a laminated structure in which a plurality of layers are laminated along the third direction;
a first internal electrode that is provided on a predetermined lamination surface in the sintered body, and extends along the first direction;
a second internal electrode that is provided on a lamination surface different from the predetermined lamination surface in the sintered body, and extends along the first direction;
a third internal electrode that is provided on a lamination surface different from the predetermined lamination surface and the lamination surface provided with the second internal electrode in the sintered body, and extends in the second direction;
a first external electrode that is provided on the first end surface, and is connected to the first internal electrode;

a second external electrode that is provided on the second end surface, and is connected to the second internal electrode; and a third external electrode that is provided on at least one of the first side surface or the second side surface, and is connected to the third internal electrode, wherein the first internal electrode includes a first facing part facing the third internal electrode in the third direction, and a first connecting part connecting the first facing part and the first external electrode, the second internal electrode includes a second facing part facing the third internal electrode in the third direction, and a second connecting part connecting the second facing part and the second external electrode, the third internal electrode is disposed between the first facing part and the second facing part, the first connecting part includes a first connection portion connected to the first external electrode, and a first narrow part having a dimension in the second direction smaller than a dimension of the first connection portion in the second direction, and the second connecting part includes a second connection portion connected to the second external electrode, and a second narrow part having a dimension in the second direction smaller than a dimension of the second connection portion in the second direction.

2. The laminated varistor according to claim 1, wherein in the second direction, the dimension of the first connection portion is smaller than a dimension of the first facing part, and in the second direction, the dimension of the second connection portion is smaller than a dimension of the second facing part.

3. The laminated varistor according to claim 1, wherein the third internal electrode includes a third facing part facing the first facing part and the second facing part in the third direction, and a third connecting part connecting the third facing part and the third external electrode, the third facing part is positioned between the first facing part and the second facing part, and the third connecting part includes a third connection portion connected to the third external electrode, and a third narrow part having a dimension in the first direction smaller than a dimension of the third connection portion in the first direction.

4. The laminated varistor according to claim 3, wherein, in the first direction, the dimension of the third connection portion is smaller than a dimension of the third facing part.

5. The laminated varistor according to claim 1, wherein the first connecting part is connected to the first external electrode via a plurality of first branch parts obtained by being divided into a plurality of portions in the second direction, the first connection portion includes a plurality of connection portions where the plurality of first branch parts are connected to the first external electrode, the second connecting part is connected to the second external electrode via a plurality of second branch parts obtained by being divided into a plurality of portions in the second direction, and the second connection portion includes a plurality of connection portions where the plurality of second branch parts are connected to the second external electrode.

6. The laminated varistor according to claim 3, wherein the third connecting part is connected to the third external electrode via a plurality of third branch parts obtained by being divided into a plurality of portions in the first direction, and the third connection portion includes a plurality of connection portions where the plurality of third branch parts are connected to the third external electrode.

7. The laminated varistor according to claim 1, further comprising:

a first varistor that is disposed between the first external electrode and the third external electrode; and a second varistor that is disposed between the second external electrode and the third external electrode, wherein an electrostatic capacitance of each of the first varistor and the second varistor is less than or equal to 200 pF, and a difference between the electrostatic capacitance of the first varistor and the electrostatic capacitance of the second varistor is less than or equal to 20% of the electrostatic capacitance of the first varistor.

* * * * *